(12) United States Patent
Honjo (10) Patent No.: US 10,973,167 B2
(45) Date of Patent: Apr. 13, 2021

(54) TRAVELING VEHICLE (71) Applicant: Kubota Corporation, Osaka (JP)

(72) Inventor: Noriyasu Honjo, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/825,218

(22) Filed: Nov. 29, 2017

(65) Prior Publication Data

US 2018/0213718 A1    Aug. 2, 2018

(30) Foreign Application Priority Data

Jan. 27, 2017    (JP) .............. JP2017-013404

(51) Int. Cl.
| B60T 7/12 | (2006.01) |
| A01D 34/00 | (2006.01) |
| F02D 31/00 | (2006.01) |
| A01D 34/64 | (2006.01) |
| A01D 34/68 | (2006.01) |
| B62D 49/06 | (2006.01) |
| G05D 1/00 | (2006.01) |

(Continued)

(52) U.S. Cl.
CPC .......... *A01D 34/008* (2013.01); *A01D 34/64* (2013.01); *A01D 34/6818* (2013.01); *B62D 49/0671* (2013.01); *F02D 31/007* (2013.01); *F02D 31/009* (2013.01); *F02D 41/123* (2013.01); *F02D 41/2422* (2013.01); *G05D 1/0088* (2013.01); *A01D 2101/00* (2013.01); *B60W 2552/25* (2020.02); *B60W 2554/00* (2020.02); *B60Y 2200/223* (2013.01); *F02D 41/1475* (2013.01); *F02D 2200/501* (2013.01)

(58) Field of Classification Search
CPC .. A01D 34/008; A01D 34/64; A01D 2101/00; F01D 34/6818; B62D 49/0671; F02D 31/007; G05D 1/10088; B60W 2550/10; B60W 2550/145; B60Y 2200/223
USPC ......................................... 701/103, 104, 105
See application file for complete search history.

(56) References Cited

U.S. PATENT DOCUMENTS 4,434,759 A * 3/1984 Iezuka ................... F02D 41/123
                                                  123/325
4,638,781 A * 1/1987 Shiki ..................... F02D 31/007
                                                  123/333

(Continued)

FOREIGN PATENT DOCUMENTS

| JP | 450448 A | 2/1992 |
| JP | H1044828 A | 2/1998 |
| JP | 2009209704 | * 9/2009 ............. F02D 17/02 |

*Primary Examiner* — Hung Q Nguyen
*Assistant Examiner* — Anthony Donald Taylor, Jr.
(74) *Attorney, Agent, or Firm* — The Webb Law Firm (57) ABSTRACT

A traveling control section of a traveling vehicle is configured to effect a normal operation to control an output of an engine when a vehicle speed is below a set vehicle speed, such that the engine output may correspond to an operation amount of an accelerator operating tool and to effect an output suppressing operation when the vehicle speed is equals to or more than the set vehicle speed, such that the vehicle speed may stay below the set vehicle speed, irrespectively of the operation amount of the accelerator operating tool. A fuel ratio in an air-fuel ratio in the output suppressing operation is set smaller than a fuel ratio in an air-fuel ratio in the normal operation.

7 Claims, 4 Drawing Sheets

(51) Int. Cl.
*F02D 41/24* (2006.01)
*F02D 41/12* (2006.01)
A01D 101/00 (2006.01)
*F02D 41/14* (2006.01)

(56) References Cited

U.S. PATENT DOCUMENTS

| | | | | |
|---|---|---|---|---|
| 4,846,127 | A * | 7/1989 | Miyama | F02D 41/123 |
| | | | | 123/325 |
| 5,119,781 | A * | 6/1992 | Trombley | F02D 41/0087 |
| | | | | 123/325 |
| 8,667,953 | B2 * | 3/2014 | Gallon | F02D 17/02 |
| | | | | 123/198 DB |
| 2010/0050993 | A1 * | 3/2010 | Zhao | F02D 17/02 |
| | | | | 123/481 |
| 2016/0108834 | A1 * | 4/2016 | McConville | F02D 41/0087 |
| | | | | 123/90.15 |

\* cited by examiner

TRAVELING VEHICLE

CROSS-REFERENCE TO RELATED APPLICATION

This application claims priority to Japanese Patent Application No. 2017-013404 filed Jan. 27, 2017, the disclosure of which is hereby incorporated in its entirety by reference.

BACKGROUND OF THE INVENTION

1. Field of the Invention

This invention relates to a traveling vehicle that travels by power from an engine.

2. Description of the Related Art

Conventionally, according to a known arrangement, when a vehicle speed exceeds a set vehicle speed, a fuel cut operation is implemented for stopping fuel supply to one of a plurality of cylinders of an engine in order to set the vehicle speed below the set vehicle speed (for instance, see JP 4-050448 A). According to this arrangement, even when the fuel cut operation described above is implemented, the fuel supply amount to the engine is set to a value which is set based on e.g. detection information of intake pressure, like the case of normal operation.

When the above-described fuel cut operation is effected, although the engine is rotating with pistons in its respective cylinders effecting reciprocating actions, combustion becomes unstable due to no feeding of fuel to the cylinders or failure of ignition operation even with presence of fuel supply. Then, fuel can stay under a non-combusted state inside an intake valve incorporated in a fuel supply passage to the engine or the combustion chamber of the cylinder.

If such residual non-combusted fuel is allowed to flow as it is to an exhaust gas passage on the downstream side, the fuel may come into contact with a hot portion inside this exhaust gas passage, thus being combusted. As a result, there will occur an undesirable situation such as the temperature of a component inside the exhaust gas passage, e.g. a catalyst for exhaust gas treatment, a muffler, etc. becoming higher than a permissible temperature, thus increasing the risk of its damage.

In view of the above, it is desired to reduce the amount of fuel staying under non-combusted state inside a fuel supply passage for the engine, inside a combustion chamber of the engine, etc.

SUMMARY OF THE INVENTION

Thus, a traveling vehicle as under is proposed:
A traveling vehicle comprising:
a vehicle body;
an engine for driving traveling of the vehicle body;
a man-operable accelerator operating tool;
a traveling control section configured as follows;
wherein:
when a vehicle speed is below a set vehicle speed, the traveling control section effects a normal operation for controlling an output of the engine such that the engine output may correspond to an operation amount of the accelerator operating tool;
when the vehicle speed is equals to or more than the set vehicle speed, the traveling control section effects an output suppressing operation for suppressing the engine output such that the vehicle speed may stay below the set vehicle speed irrespectively of the operation amount of the accelerator operating tool; and
wherein a fuel ratio in an air-fuel ratio in the output suppressing operation is set lower than a fuel ratio in the air-fuel ratio in the normal operation.

With this arrangement, when an output suppressing operation is being effected, it is possible to reduce the amount of fuel which stays under a non-combusted state inside the fuel supply passage to the engine, inside the combustion chamber of the engine, etc. As a result, it becomes readily possible to avoid the risk of non-combusted fuel being combusted to damage a component inside the exhaust gas passage.

According to one preferred embodiment, even when the vehicle speed is below the set vehicle speed, the traveling control section is configured to effect the output suppressing operation if an output rotational speed of the engine is equals to or more than a set upper limit rotational speed.

This means, even when the vehicle speed is below a set vehicle speed, with e.g. an arrangement that power of the engine is transmitted to a traveling device via a speed changer, an output rotational speed of the engine may still exceed a set upper limit rotational speed, e.g. when the speed changer is switched from a low speed state to a high speed state.

Then, according to the inventive arrangement, the output suppressing operation is effected if the output rotational speed of the engine is higher than the set upper limit rotational speed even when the vehicle speed is below the set vehicle speed. As a result, the engine output rotational speed is suppressed to be below the set upper limit rotational speed. And, when the speed position is changed while the vehicle speed is below the set vehicle speed, it becomes readily possible to avoid the inconvenience of switchover of the speed inadvertently leading to the situation of the engine output rotational speed exceeding the set upper limit rotational speed.

According to one preferred embodiment, the traveling control section includes a map data storage section that stores map data for adjustment of the air-fuel ratio in correspondence with an operation amount of the accelerator operating tool;
the map data includes map data for the normal operation and map data for the output suppressing operation; and
a fuel ratio of the map data for the output suppressing operation is set smaller than a fuel ratio of the map data for the normal operation.

With the above-described arrangement, the traveling control section sets an air-fuel ratio, based on an operation amount of the accelerator operating tool and preset controlling map data and includes different map data for effecting the output suppressing operation and the normal operation, respectively. When the map data for effecting the output suppressing operation is used, it is possible to set an air-fuel ratio having a smaller fuel ratio than the case of effecting the normal operation.

By selectively using different controlling map data appropriately, different air-fuel ratios are set in the case of effecting the output suppressing operation and the case of effecting the normal operation. Then, in the case of setting only one kind of map data for normal operation, for effecting the output suppressing operation, this would require obtaining and setting an air-fuel ratio therefor by a calculation operation on the map data for the normal operation for each unit period. In comparison with such arrangement, the above inventive arrangement allows speedy operation.

According to one preferred embodiment, the traveling control section is configured to implement, in the output suppressing operation, a fuel cut operation for reducing a fuel supply amount to the engine.

With the above-described arrangement, by effecting e.g. such an operation to stop fuel supply to one/some or all of a plurality of cylinders of the engine, as the fuel cut operation for reducing fuel supply amount, the engine output will be suppressed to an output smaller than the output corresponding to an operation amount of the accelerator operating tool in the case of effecting the normal operation. As a result, it is possible to restrict the vehicle speed and the engine output rotational speed below the respective set values.

According to one preferred embodiment, the traveling vehicle further comprises: a man-operable speed changer tool for setting a traveling direction of the vehicle body and one of a plurality of speed positions;

wherein the traveling control section includes a maximal vehicle speed setting section configured to set a plurality of set vehicle speeds according to the traveling direction and the one speed set by the speed changer.

With the above-described arrangement, the output suppressing operation can be effected in an even more advantageous manner based on e.g. forward/reverse traveling of the vehicle body and various set vehicle speeds corresponding to traveling speeds.

Further and other features and advantageous effects achieved thereby will become apparent upon reading the following detailed description with reference to the accompanying drawings.

DETAILED DESCRIPTION OF PREFERRED EMBODIMENTS

[General Configuration]

Figure 1:
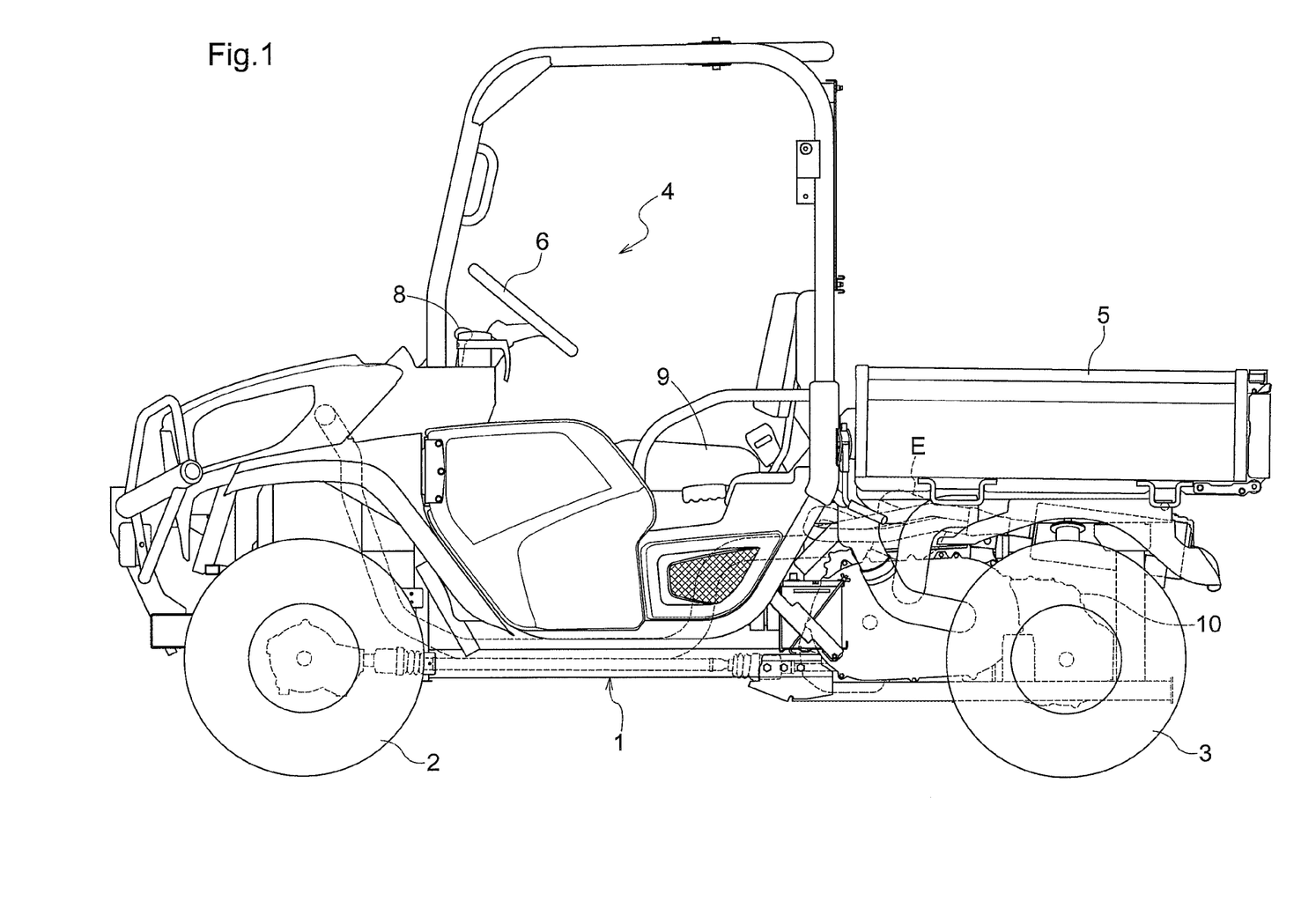
FIG. 1 is a side view of an entire multi-purpose vehicle according to one embodiment.

FIG. 1 shows a multi-purpose vehicle (an example of a "traveling vehicle") according to one embodiment which is configured as a vehicle usable for multiple purposes such as load transport, recreation, etc. The multi-purpose vehicle includes an engine E having a plurality of cylinders A, and a traveling vehicle body 1 (corresponding to a "vehicle body") having a traveling device T driven by driving power of the engine E. The traveling device T includes a pair of right and left front wheels 2 which can be driven and steered, and a pair of right and left rear wheels 3 which can be driven. At a center portion of the traveling vehicle body 1, there is provided a driving section 4 where an operator will ride and effect a driving operation. At a rear portion of the traveling vehicle body 1, there is provided a load carrying deck 5 that can carry a load and is capable of load mounting and dumping operations.

Figure 3:
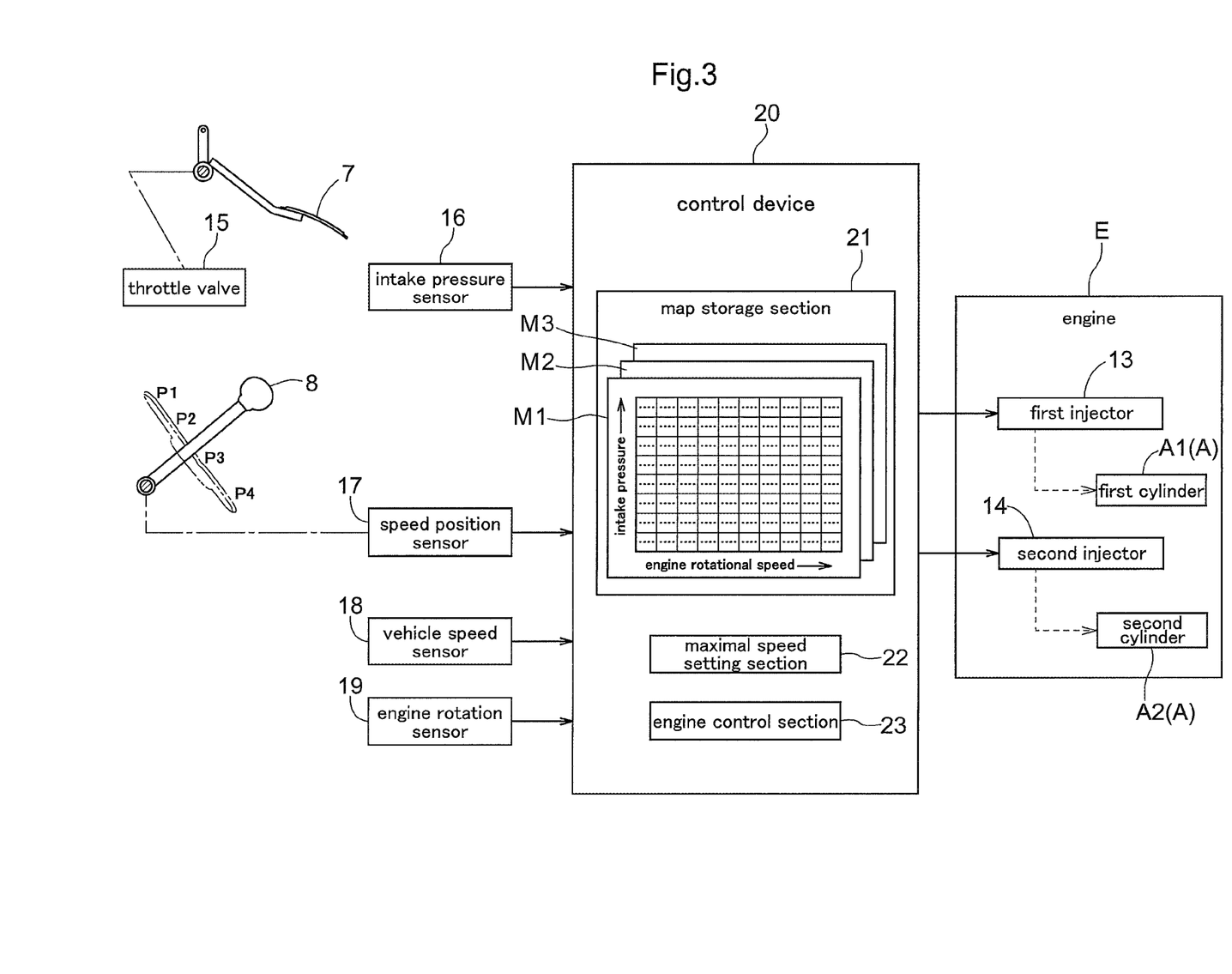
FIG. 3 is a control block diagram of the multi-purpose vehicle.

The driving section 4 includes: a steering wheel 6 for steering the front wheels 2; a man-operable accelerator operating tool 7 for changing a traveling speed; a speed changer lever 8 for speed changing operations (corresponding to a "man-operable speed changer tool"); a driver's seat 9 at which an operator can be seated, and so on. The accelerator operating tool 7 is configured as a pedal type operating tool which is pivotally operated by a stepping-on operation and which is urged to be returned to an initial position upon removal of a foot therefrom. As shown in FIG. 3, the speed changer lever 8 is configured to be switchable into a forward first speed position P1, a forward second speed position P2, a neutral position P3 and a reverse position P4.

[Transmission System]

Figure 2:
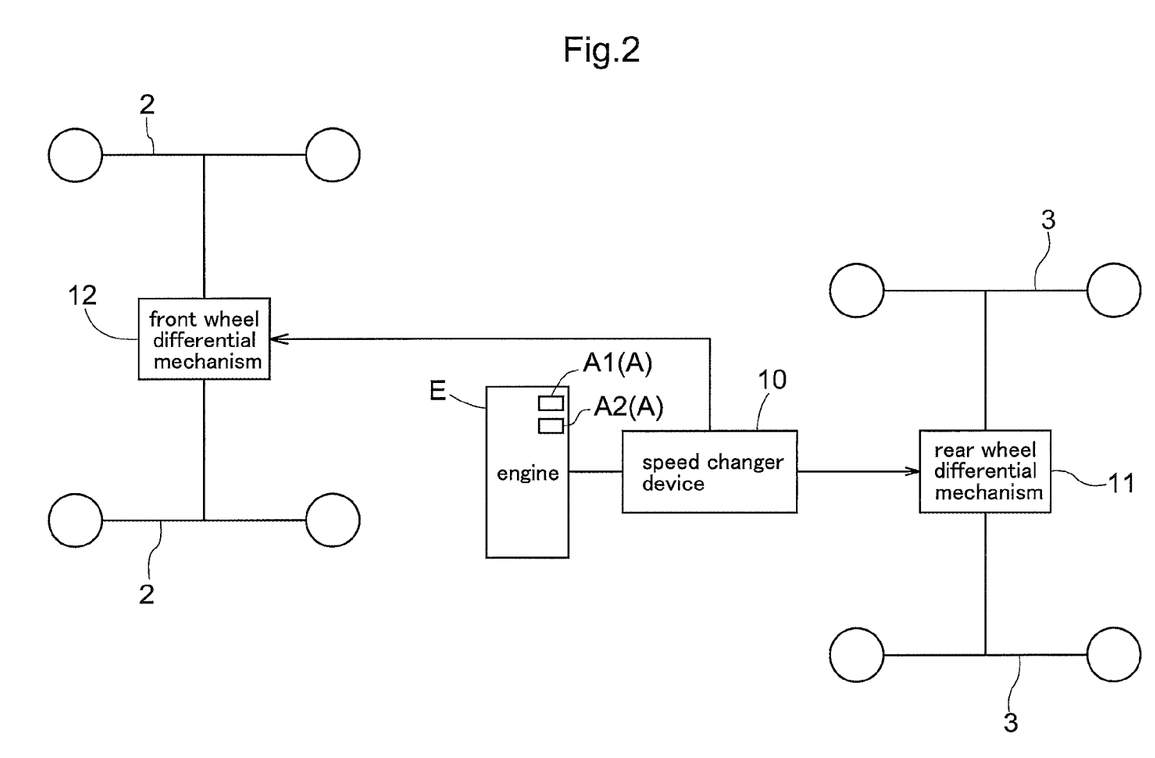
FIG. 2 is a transmission system diagram of the multi-purpose vehicle.

As shown in FIG. 2, the traveling vehicle body includes a speed changer device 10 configured to speed-change the output of the engine E and then transmitted the speed-changed output to the front wheels 2 and the rear wheels 3. The speed changer device 10 can be switched into one of a plurality of speed changing states for providing difference speed changing ratios. Specifically, the speed changing state of the speed changer device 10 can be switched to a forward first-speed state, a forward second-speed state, a neutral state and a reverse state. The forward first-speed state, the forward second-speed state, and the reverse state provide different speed changing ratios from each other. Under the neutral state, power transmission is blocked, so that the traveling vehicle is put into a traveling stop state.

The power outputted from the speed changer device 10 is transmitted to the right and left rear wheels 3 via a rear wheel differential mechanism 11 and transmitted also to the right and left front wheels 2 via a front wheel differential mechanism 12. When the speed changer device 10 is under the forward first-speed state, the vehicle body travels forwardly at a low speed. When the speed changer device 10 is under the forward second-speed state, the vehicle body travels forwardly at a speed higher than the forward first-speed state. When the speed changer device 10 is under the neutral state, the vehicle body stops traveling. When the speed changer device 10 is under the reverse state, the vehicle travels reversely.

[Explanation of Control Block]

As shown in FIG. 3, the engine E includes a plurality of cylinders A, namely, a first cylinder A1 and a second cylinder A2. Into the first cylinder A1, an amount of fuel in the form of mist is injected from a first injector 13. Into the second cylinder A2, an amount of fuel in the form of mist is injected from a second injector 14. The first cylinder A1 and the second cylinder A2 are configured to be operated in alternation with each other.

A combustion air intake passage for the engine E incorporates an intake valve 15 for adjusting a supply amount of combustion air. This intake valve (a throttle valve) 15 is operated in association with an operation on the accelerator operating tool 7. Further, there are also provided an intake air pressure sensor 16 for detecting a pressure inside the intake passage, a speed position sensor 17 for detecting an operational position of the speed changer lever 8, a vehicle speed sensor 18 for detecting a traveling speed (a vehicle speed) of the vehicle body, an engine rotation sensor 19 for detecting an actual rotational speed of the engine E, and so on.

A control device 20 (corresponding to a "traveling control section") is provided for controlling the output of the engine E by variably adjusting fuel injection amounts for the first cylinder A1 and the second cylinder A2 of the engine E. The control device 20 is comprised by including a microcomputer.

As shown in FIG. 2, the control device 20 includes a map storage section 21, a maximal speed setting section 22, and an engine control section 23 for controlling e.g. operations of the first injector 13 and the second injector 14 of the engine E. The map storage section 21 stores, as preset map data therein, relationships between intake pressures corresponding to operation amounts of the accelerator operating tool 7 and target engine rotational speeds corresponding to such intake pressures.

In the map data, various kinds of control information that correlate the intake pressures with engine rotational speeds is set in the form of a map. For instance, with one of the intake pressure and the engine rotational speed being represented on the vertical axis and the other being represented on the horizontal axis, air-fuel ratio data respectively corresponding to a plurality of operation points on the map are set and stored in advance. Further, in addition to the air-fuel ratio data, ignition timing data respectively corresponding to a plurality of operation points on the map are set and stored in advance.

The map storage section 21 includes a first map M1 having map data for "normal operation", a second map M2 dedicated to air-fuel ratio correction and containing air-fuel ratio data corrected to be suited to an "output suppressing operation", and a third map M3 dedicated to ignition timing correction and containing ignition timing data corrected to be suited to the "output suppressing operation". The "output suppressing operation" will be described in greater details later herein.

The first map M1 is provided for effecting the "normal operation" for controlling the output of the engine E such that the output may correspond to an operation amount of the accelerator operating tool 7, while suppressing fuel consumption as much as possible. Though not described in detail, air-fuel ratio data and ignition timing data too will be set in correlation with each other. Namely, in this first map M1, there are set a group of data corresponding to air-fuel ratios for effecting the "normal operation" (e.g. theoretical air-fuel ratios). On the other hand, in the second map M2, there are set a group of data which provide air-fuel ratios having smaller fuel ratios. Further, in the third map M3, there are set a group of data corresponding to ignition timings which are advanced relative to ignition timing for the "normal operation".

Fuel injection amounts for the first cylinder A1 and the second cylinder A2 of the engine E are determined based on these map data. Basically, operation conditions such as fuel injection amounts, etc. are determined such that an actual output rotational speed of the engine E may be a target engine rotational speed corresponding to an operation amount of the accelerator operating tool 7.

If an actual vehicle speed Vx detected by the vehicle speed sensor 18 is below a set vehicle speed Vs, the control device 20 executes a "normal operation" for controlling fuel injection amounts to the engine E (the first cylinder A1 and the second cylinder A2), based on detection information from the intake pressure sensor 16, detection information from the engine rotation sensor 19 and the map data for the "normal operation".

When the actual vehicle speed Vx detected by the vehicle speed sensor 18 becomes equal to or more than the set vehicle speed Vs, on the other hand, the control device 20 executes the "output suppressing operation" to render zero for the fuel injection amount(s) to one/some of the cylinders A (either one of the first cylinder A1 and the second cylinder A2 in the illustrated embodiment) of the plurality of cylinders A, irrespectively of the operation amount of the accelerator operating tool 7.

The control device 20 sets set vehicle speeds Vs which are different for respective speed changing states. Specifically, different set vehicle speeds Vs will be set for the forward first-speed state, the forward second-speed state and the reverse state, respectively. Namely, based on information concerning the operation position of the speed changer lever 8, the maximal vehicle speed setting section 22 of the control device 20 determines which of the forward first-speed state, the forward second-speed state and the reverse state the speed changing state of the speed changer device 10 is in, and then based on the determined speed changing state, sets a set vehicle speed Vs corresponding to each speed changing state.

The control device 20 is configured not only to effect the "output suppressing operation" when the actual vehicle speed Vx becomes equal to or more than the set vehicle speed Vs; but also to effect the "output suppressing operation", even when the actual vehicle speed Vx is below the set vehicle speed Vx and if an actual rotational speed of the engine E (an actual engine rotational speed) Nx becomes equal to or more than a set rotational speed (a set upper limit rotational speed) Ns. The set rotational speed Ns is set as a value lower by a set amount than a mechanical upper limit rotational speed of the engine E, so that application of excessive load to the engine E is avoided by effecting the "output suppressing operation".

Further, an arrangement is provided such that, when the actual vehicle speed Vx becomes equal to or more than the set vehicle speed Vs during execution of the "output suppressing operation", the cylinder A to render its fuel injection amount zero will be switched over in alternation for a predetermined period.

[Output Control Operation of Engine]

Figure 4:
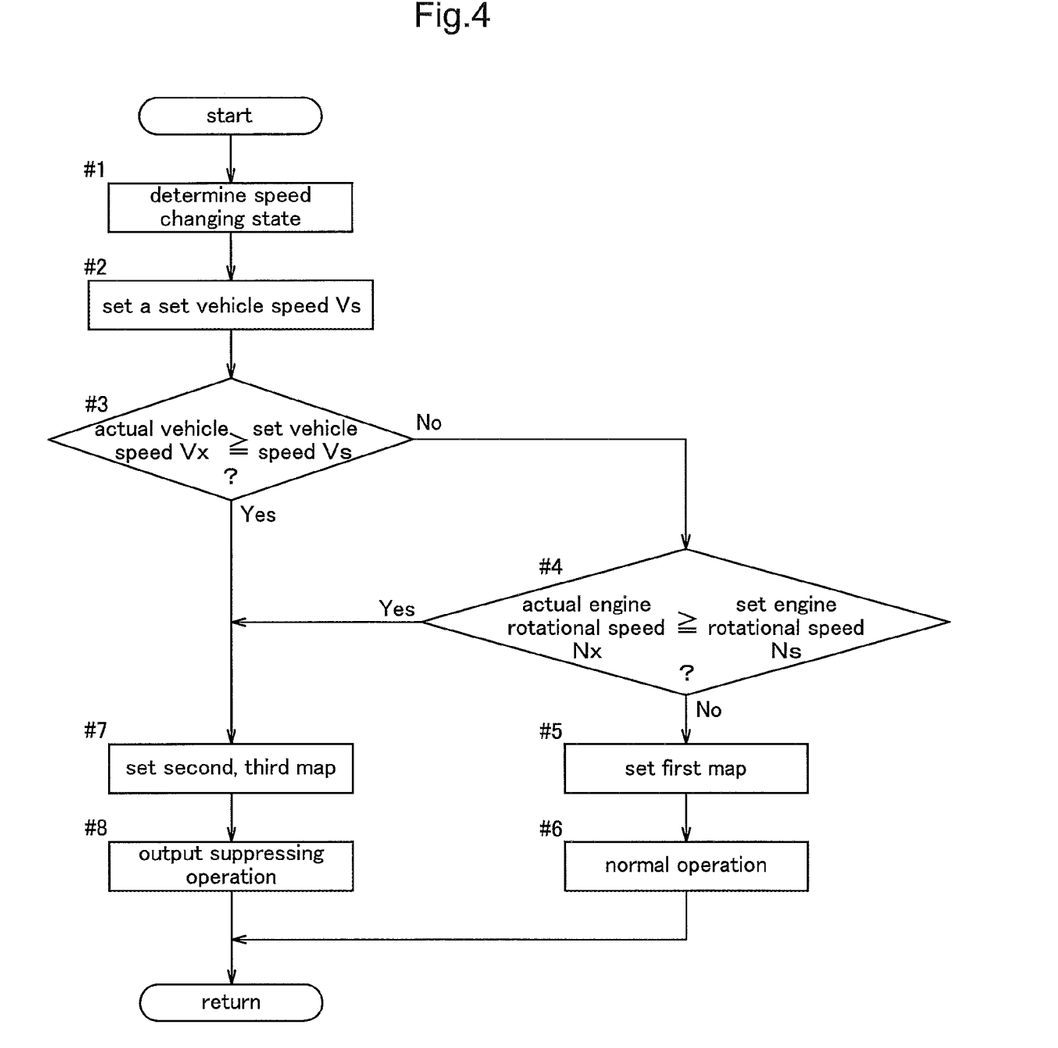
FIG. 4 is a flowchart of a control operation.

With reference to the flowchart shown in FIG. 4, the specific control operation of the control device 20 will be described next. The control device 20 is configured to effect such an operation in repetition for each set unit period.

Firstly, based on the detection information from the speed position sensor 17, the process determines which of the forward first-position, the forward second-speed position and the reverse position the speed changing state of the speed changer 10 is in (step #1); and sets a set vehicle speed Vs corresponding to the determined speed changing position (step #2).

If the actual vehicle speed Vx detected by the vehicle speed sensor 18 is below the set vehicle speed Vs and the actual engine rotational speed Nx detected by the engine rotation sensor 19 is below the set rotational speed Ns, then, the process executes the "normal operation" for controlling the fuel injection amount for the engine E (the first cylinder A1 and the second cylinder A2) by using the first map M1 among the plurality of map data stored in the map storage section 21 (NO at step #3, NO at step #4, steps #5 and 6). Namely, the first injector 13 and the second injector 14 are controlled such that the fuel injection amount of each of the first cylinder A1 and the second cylinder A2 is caused to correspond to the operation amount of the accelerator operating tool 7, and that the air-fuel ratio is set to the theoretical air-fuel ratio or approximately thereto.

If the actual vehicle speed Vx detected by the vehicle speed sensor 18 is equal to or more than the set vehicle speed Vs, on the other hand, the process uses the second map M2 among the plurality of data map stored in the map storage section 21 to execute the "output suppressing operation" by controlling the fuel injection amount to the engine E (the first cylinder A1 and the second cylinder A2) and implementing the "fuel cut operation" for reducing the fuel supply amount to the engine E (YES at step #3, steps #7 and #8).

Further, this "output suppressing operation" is executed also if the actual rotational speed of the engine E (actual engine rotational speed) Nx exceeds a set rotational speed Ns even if the actual vehicle speed Vx is below the set vehicle speed Vs (NO at step #3, YES at step #4, steps #7 and #8).

[Output Suppressing Operation]

In the "output suppressing operation", "one-side fuel blocking state" and "other-side fuel blocking state" are provided in repeated alternation by a predetermined period.

In the one-side fuel blocking state, the first injector 13 is controlled so as to render zero the fuel injection amount to the first cylinder A1 of the two cylinders A; and the second injector 14 is controlled so as to cause the fuel injection amount to the second cylinder A2 to correspond to the operation amount of the accelerator operating tool 7.

In the "other-side fuel blocking state", the second injector 14 is controlled so as to render zero the fuel injection amount to the second cylinder A2; and the first injector 13 is controlled so as to cause the fuel injection amount to the first cylinder A1 to correspond to the operation amount of the accelerator operating tool 7.

In such a "partial cylinder fuel blocking operation", suppression of fuel injection amount (making the fuel injection amount zero) is effected for only one/some of the cylinders. In addition, the cylinder A for which the fuel injection amount suppression is effected is switched over in alternation. With this arrangement, it becomes possible to suppress irregularity of temperature, and irregularity of load between the first cylinder A1 and the second cylinder A2. Consequently, suppression of vehicle speed of the vehicle body can be effected without impairing the durability of the engine E.

In the "output suppressing operation", the process uses the second map M2 among the plurality of map data stored in the map storage section 21 to control the fuel injection amount to the engine (the first cylinder A1 and the second cylinder A2). By effecting the control with using the second map M2 as described above, in comparison with the control effected in the "normal operation", the first injector 13 and the second injector 14 are controlled with lower fuel ratios in the respective air-fuel ratios.

As a result, when the fuel injection amount to either one of the cylinders A is rendered zero in the "output suppressing operation", it is possible to minimize an amount of fuel staying under a non-combusted state inside the fuel supply passage and/or the cylinders A.

Moreover, in the "output suppressing operation", with using the third map M3, it is possible to reduce the exhaust gas temperature by advancing the ignition timing for the engine E (the first cylinder A1 and the second cylinder A2) relative to the timing at the time of "normal operation" (steps #7 and #8).

Other Embodiments (1) In the foregoing embodiment, there was provided the map data that provide lower fuel ratio in the air-fuel ratio when effecting the "output suppressing operation", than when effecting the "normal operation". Instead thereof, one kind of map data for "normal operation" may be prepared alone. When the "output suppressing operation" is to be effected in this alternative embodiment, an air-fuel ratio may be obtained and set by a calculation for each unit period on this map data prepared for the "normal operation".

(2) In the foregoing embodiment, the "output suppressing operation" is effected if the output rotational speed of the engine E (the actual engine rotational speed Nx) becomes equal to or more than the set rotational speed (set upper limit rotational speed) Ns. Instead thereof, the "output suppressing operation" can be effected only when the vehicle speed is equals to or more than a set vehicle speed, irrespectively of the output rotational speed of the engine E.

(3) In the foregoing embodiment, as the operation for suppressing the fuel injection amount to one cylinder of the plurality of cylinders A, the two cylinders A for which the fuel injection amount suppression is to be effected are alternated. The invention is not limited thereto. For instance, the cylinder for which the fuel injection amount suppression is to be effected is switched to the other cylinder A if the temperature of an exhaust pipe corresponding to the cylinder A becomes below a set temperature in the course of ongoing suppression of fuel injection amount.

(4) In the foregoing embodiment, there was shown the engine E having two cylinders A, namely, the first cylinder A1 and the second cylinder A2. The invention is not limited thereto. For instance, the engine E can have three or more cylinders A. And, in case the engine E has three or more cylinders A, the suppression of fuel injection amount can be effected for two or more cylinders A as a "part (one or some)" of the plurality of cylinders A.

(5) In the foregoing embodiment, as the accelerator operating tool 7, there was shown the pedal type operational tool which is pivotally operated by a foot stepping-on operation. The invention is not limited thereto. For instance, it can be any other operating tool such as a hand accelerator lever which is manually operable and can be held in position at a predetermined position.

(6) In the foregoing embodiment, there was shown the speed changer device 10 configured to be switchable into three speed changing ratios, i.e. the forward first-speed position, the forward second-speed position and the reverse position. The invention is not limited thereto. For instance, it can be a speed changer device 10 configured to be switchable into forward speed positions providing four or more speed changing ratios and switchable also into e.g. a forward third-speed position.

(7) In the foregoing embodiment, as an example of traveling vehicle, there was shown a multi-purpose vehicle. The invention is not limited thereto. For instance, it can be any other traveling vehicle that is configured to travel by power of an engine.

What is claimed is:

1. A vehicle comprising:
 a vehicle body;
 an engine;
 a plurality of fuel injectors;
 a plurality of cylinders;
 a man-operable accelerator operating tool; and
 a control device configured as follows:
 when a vehicle speed is below a set vehicle speed, the control device affects a normal operation for controlling a fuel volume that is injected by the plurality of fuel injectors such that an engine output will correspond to an operation amount of the man-operable accelerator operating tool;
 when the vehicle speed is equal to or more than the set vehicle speed, the control device affects an output suppressing operation for suppressing the engine output by adjusting the fuel volume that is injected by the plurality of fuel injectors such that the vehicle speed will stay below the set vehicle speed regardless of the operation amount of the man-operable accelerator operating tool, and such that the fuel volume in an air-fuel ratio in the output suppressing operation is set lower than the fuel volume in the air-fuel ratio in the normal operation; and wherein the output suppressing operation is affected by rendering zero for the fuel volume to at least one first cylinder of the plurality of cylinders while controlling the fuel volume to at least one second cylinder of the plurality of cylinders to correspond to the operation amount of the man-operable accelerator operating tool, the at least one first cylinder to render the fuel volume zero being switched over in alternation to the at least one second cylinder for a predetermined amount of time at which point the fuel volume of the previous at least one first cylinder increases above zero to correspond to the operation amount of the man-operable accelerator operating tool, the predetermined amount of time being fixed regardless of the operation amount of the man-operable accelerator operating tool.

2. The vehicle according to claim 1, wherein even when the vehicle speed is below the set vehicle speed, the control device is configured to affect the output suppressing operation if an output rotational speed of the engine is equal to or more than a set upper limit rotational speed.

3. The vehicle according to claim 1, wherein:
the control device includes a map data storage section that stores map data for adjustment of the air-fuel ratio in correspondence with the operation amount of the man-operable accelerator operating tool;
the map data includes normal operation map data and output suppressing operation map data; and
the fuel volume for the output suppressing operation map data is set smaller than the fuel volume for the normal operation map data.

4. The vehicle according to claim 1, wherein the control device is configured to implement, in the output suppressing operation, a fuel cut operation for reducing a fuel supply amount to the engine by adjusting the fuel volume that is injected by at least one fuel injector of the plurality of fuel injectors.

5. The vehicle according to claim 1, further comprising:
a man-operable speed changer tool configured to set a traveling direction of the vehicle body and one of a plurality of speed positions;
wherein the control device includes a maximal speed setting section programmed to set a plurality of set vehicle speeds according to the traveling direction of the vehicle body and the one speed position set by the man-operable speed changer tool.

6. A vehicle comprising:
a vehicle body;
an engine;
a plurality of fuel injectors;
a plurality of cylinders;
a man-operable accelerator operating tool; and
a control device configured as follows:
when a vehicle speed is below a set vehicle speed, the control device affects a normal operation for controlling a fuel volume that is injected by the plurality of fuel injectors such that an engine output will correspond to an operation amount of the man-operable accelerator operating tool;
when the vehicle speed is equal to or more than the set vehicle speed, the control device affects an output suppressing operation for suppressing the engine output by adjusting the fuel volume that is injected by the plurality of fuel injectors such that the vehicle speed will stay below the set vehicle speed regardless of the operation amount of the man-operable accelerator operating tool, and such that the fuel volume in an air-fuel ratio in the output suppressing operation is set lower than the fuel volume in the air-fuel ratio in the normal operation; and wherein the output suppressing operation is affected by rendering zero for the fuel volume to at least one first cylinder of the plurality of cylinders while controlling the fuel volume to at least one second cylinder of the plurality of cylinders to correspond to the operation amount of the man-operable accelerator operating tool, the at least one first cylinder to render the fuel volume zero being switched over in alternation to the at least one second cylinder for a predetermined amount of time at which point the fuel volume of the previous at least one first cylinder increases above zero to correspond to the operation amount of the man-operable accelerator operating tool, wherein the predetermined amount of time is set regardless of the operation amount of the man-operable accelerator operating tool.

7. A vehicle comprising:
a vehicle body;
an engine;
a plurality of fuel injectors;
a plurality of cylinders;
a man-operable accelerator operating tool; and
a control device configured as follows:
when a vehicle speed is below a set vehicle speed, the control device affects a normal operation for controlling a fuel volume that is injected by the plurality of fuel injectors such that an engine output will correspond to an operation amount of the man-operable accelerator operating tool;
when the vehicle speed is equal to or more than the set vehicle speed, the control device affects an output suppressing operation for suppressing the engine output by adjusting the fuel volume that is injected by the plurality of fuel injectors such that the vehicle speed will stay below the set vehicle speed regardless of the operation amount of the man-operable accelerator operating tool, and such that the fuel volume in an air-fuel ratio in the output suppressing operation is set lower than the fuel volume in the air-fuel ratio in the normal operation;

wherein the output suppressing operation is affected by rendering zero for the fuel volume to at least one first cylinder of the plurality of cylinders while controlling the fuel volume to at least one second cylinder of the plurality of cylinders to correspond to the operation amount of the man-operable accelerator operating tool, the at least one first cylinder to render the fuel volume zero being switched over in alternation to the at least one second cylinder for a predetermined amount of time at which point the fuel volume of the previous at least one first cylinder increases above zero to correspond to the operation amount of the man-operable accelerator operating tool, the predetermined amount of time being set regardless of the operation amount of the man-operable accelerator operating tool; and wherein, during the output suppressing operation, an ignition timing for the at least one first cylinder and the at least one second cylinder is advanced relative to the ignition timing for the at least one first cylinder and the at least one second cylinder in the normal operation.

* * * * *